UNITED STATES PATENT OFFICE

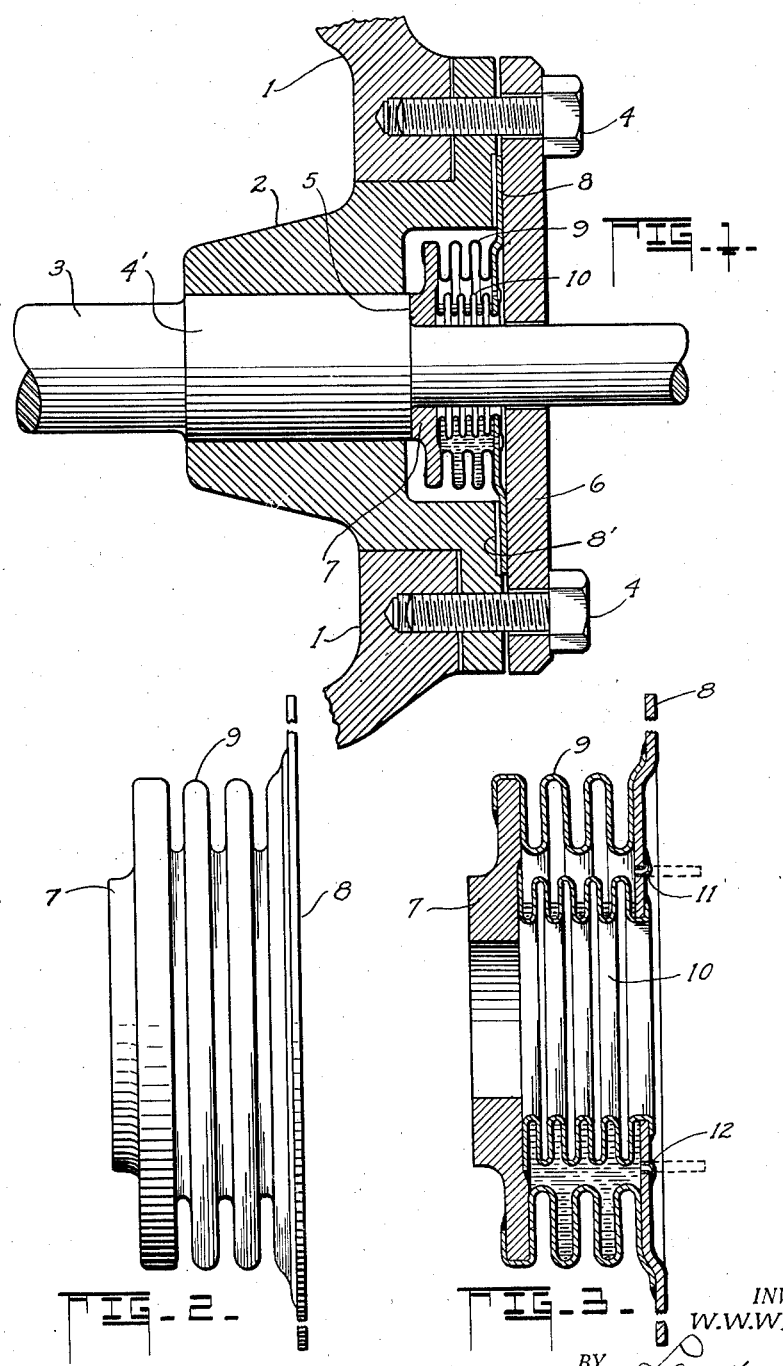

WALTER W. WILLIAMS, OF BLOOMINGTON, ILLINOIS, ASSIGNOR TO WILLIAMS OIL-O-MATIC HEATING CORPORATION, OF BLOOMINGTON, ILLINOIS, A CORPORATION OF ILLINOIS

EXPANDING STUFFING BOX

Application filed July 27, 1927. Serial No. 208,682.

This invention relates to improvements in stuffing boxes and more particularly to a stuffing box which is self-expanding.

In compressors or other devices in which a rotating shaft passes through a bearing wherein the pressure is greater upon one side than upon the other, it is necessary to provide a stuffing box for the purpose of preventing a leakage of the pressure between the shaft and the bearing member. It is just as necessary to provide a stuffing box for this purpose to prevent the escape of gas as well as liquid and it is immaterial whether the stuffing box is installed in a compression machine or any other device wherein the pressure is greater upon one side of the bearing than upon the other.

It is an object of this invention to provide a stuffing box particularly adapted to devices creating an internal pressure within a compression chamber for application about a rotating shaft entering said chamber for the purpose of operating a compression device. It is another object of this invention to provide a stuffing box which, by its construction, will form a gas and liquid tight seal against a shoulder upon the rotating shaft. In devices of this character, when the compression device is idle the pressure within the compression chamber is less, as a rule, than when the device is in operation and it is a further object of this invention to provide a stuffing box which will bear against the shoulder upon the rotating shaft with a predetermined pressure when the shaft is idle and so constructed that the rotation of the shaft will increase the pressure of the stuffing box against the shaft shoulder when the compressor is in operation.

While the preferred form of this invention is illustrated upon the accompanying sheet of drawing, yet it is to be understood that minor detail changes may be made without departing from the scope thereof.

In the drawing:

Figure 1 is a fragmentary sectional view through the bearing of a compression chamber illustrating the compression device driving shaft in the full lines.

Figure 2 is a detail view in side elevation of this improved stuffing box with parts broken away.

Figure 3 is a central longitudinal vertical sectional view of Figure 2.

In the embodiment of this invention, as illustrated upon the drawing, the walls 1 of the compression chamber are shown broken away. The usual bearing lock 2 surrounding the driving shaft 3 is secured in place by the cap screws 4. The driving shaft 3 is provided with a shoulder portion 4' extending through the bearing block 3 and reduced in diameter at the outer side thereof to form a shoulder 5. The bearing block 2 is recessed about the shaft to form space for a stuffing box, as is customary. The outer side of this recess is closed by the usual cover plate 6 held in place by the cap screws 4 engaging the side walls of the compression chamber 1 also holding the bearing block in place.

This improved stuffing box comprises a circular bearing member or seal having a bearing surface adapted to engage and bear against the shoulder 5 of the shaft 3 and a circular collar plate 8 of greater diameter than the stuffing box receiving recesses adapted to be engaged and held in position between the outer surface of the bearing block 2 and the inner surface of the cover plate 6 preferably against a gasket 8' upon the bearing block. The members 7 and 8 are connected to each other by two concentric metallic bellows arranged one about the other. It is preferable to secure the outer bellows 9 to the seal member 7 in the manner shown by bending one extremity about the outer edge of the circular plate and permanently securing thereto by solder or other means which will provide a gas tight joint. It is preferable to connect the corresponding extremity of the inner bellows 10 by solder or otherwise securing one of its convolutions to the outer side of said plate, as shown. The collar plate 8 is preferably struck inward, as shown, and the adjacent extremity of the outer bellows 9 is attached thereto by extending one of its convolutions to follow the angular part of the struck-in portion of plate 8, as shown, and secured thereto by solder or other means of forming a gas-tight joint. The corresponding end of the inner bellows 10 is secured about the opening for the passage of the shaft through the plate 8 preferably by bending one of its convolutions about the edge of said opening and secure the same thereto by solder or other means of forming a gas-tight joint.

The stuffing box constructed in the manner described will normally bear against the shoulder 5 of the driving shaft when the shaft is at rest with sufficient pressure to allow the driving shaft to be rotated. Upon rotation of the shaft during the operation of the compression mechanism, the heat generated by the rotation of the shoulder 5 against the bearing surface of the seal 7 will be transmitted through the body of the seal to the space between the walls of the two bellows. By filling this space between the walls of the inner and outer bellows with a gas or liquid, as desired, the heat so transmitted will cause the contained gas or liquid to expand thereby causing the stuffing box to bear with greater force against the shoulder 5. By the selection of the proper gas or liquid to meet the conditions, the pressure of contact between the stuffing box and shoulder upon the rotating shaft can be regulated as desired. As shown upon the drawings, in this particular case, the expanding medium employed is a liquid which will vaporize at a predetermined temperature and is shown as partially filling the space between the bellows walls so that when the heat caused by the friction between the parts 5 and 7 is transmitted in a sufficient degree to cause ebullience of the liquid, the increase in the internal pressure between the bellows will cause the seal 7 to engage the shoulder 5 with sufficient pressure to form a gas and liquid tight seal. In order to insert the desired gas or liquid between the walls of the inner and outer bellows, it is preferable to provide oppositely disposed tubes 11 and 12 passing through the collar plate 8, as shown, communicating with the space between the bellows. These tubes are normally opened at their outer ends, as illustrated in the dotted lines, and the contained air may be removed from the interior through one tube while the desired gas or liquid is inserted between the bellows through the other tube and when the desired proportions have been reached, the ends of the tubes are sealed and bent over, as shown in full lines. It is to be noted that the depressed portion of the collar plate 8 allows for this sealing of the tubes as well as for the securing of the inner bellows thereto without contacting with the cover plate 6.

In the compression type of ice machines for domestic purposes, the pressure and temperature within the compression chamber or crank case, as the case may be, through which the driving shaft of the compressor passes, vary with changing conditions, for instance, there are times when the refrigerating medium is returned to the compressor at a higher temperature than at other times and with the higher temperature medium a greater pressure must be created to deliver it from the compressor under the proper compression, likewise, the normal temperature surrounding the compressor may be low and the pressure within the compressor chamber may also be low, while on the other hand, the surrounding atmosphere may be of a higher temperature and the pressure within the compression chamber may be higher, even in the latter two cases when the compression device is idle. It is to be seen that stuffing boxes for such machines must be so constructed as to normally form a seal with the shouldered shaft under varying pressures when the compression device is idle and must also be so constructed as to increase the pressure between the stuffing box and shouldered shaft as the pressure and temperature increases during operation. The stuffing box constructed in accordance with this invention does not rely entirely upon the heat generated by friction between the sealing member and shaft shoulder because when the refrigerating medium is returned to the compression device at a higher temperature than during the normal operation thereof, the temperature of the whole compression device is likewise increased so that the heat within the compression chamber or crank case, as the case may be, is transmitted through the operating shaft, bearing block and walls of said chamber to the expansible and contractable elements of the stuffing box, causing the same to expand and increase the tension thereof against the shaft shoulder to form a tight seal, and the same applies to changes in atmospheric temperature changes.

What I claim is:

A stuffing box for a casing having a bearing block, a shouldered shaft mounted for rotation therein, a non-rotatable sealing ring bearing against the shoulder of the shaft, a collar plate secured to the casing, a hollow annular expansible and contractable member comprising two concentric spaced apart bellows interposed between and secured at opposite ends to the sealing ring and collar plate, respectively, and a fluid within said annular member whereby upon rotation of the shaft the heat generated by friction between the fixed ring and rotating shoulder is transmitted to said fluid causing the same to expand and force the ring against the shoulder.

Signed at Bloomington, Illinois, this 20th day of July, 1927.

WALTER W. WILLIAMS.